UNITED STATES PATENT OFFICE.

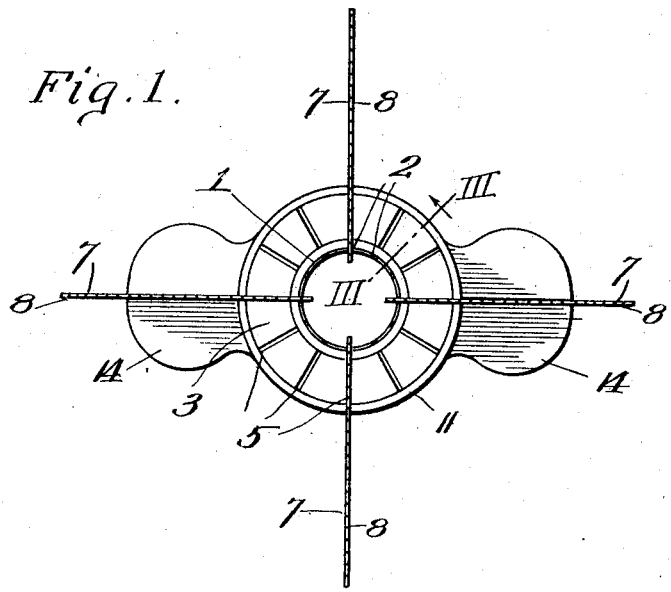
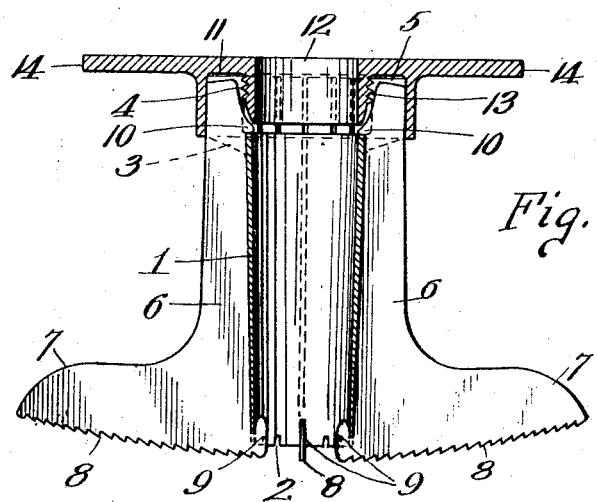
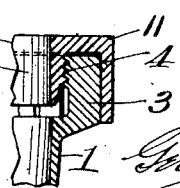

HENRY E. MEYERS, OF DENVER, COLORADO.

FRUIT CORER AND CUTTER.

1,365,118. Specification of Letters Patent. Patented Jan. 11, 1921.

Application filed January 27, 1919, Serial No. 273,457. Renewed November 29, 1920. Serial No. 427,213.

*To all whom it may concern:*

Be it known that I, HENRY E. MEYERS, a citizen of the United States, residing at Denver, in the county of Denver and State of Colorado, have invented certain new and useful Improvements in Fruit Corers and Cutters, of which the following is a specification.

This invention relates to fruit corers and cutters, and has for its object to produce a simple and economical device by which the operation of coring apples or the like, may be easily and quickly executed, and by which the fruit can also be cut into two sections of equal or different size or into more than two sections some of which may be of the same size or all of different size.

A further object is to produce a device of the character set forth which will perform its function efficiently, is of strong, durable and cheap construction and can be easily and quickly cleaned.

With these objects in view the invention consists in certain novel and peculiar features of construction and organization of parts as hereinafter described and claimed; and in order that it may be fully understood reference is to be had to the accompanying drawing, in which:

Figure 1, is a bottom plan view of a fruit corer and cutter embodying the invention.

Fig. 2, is a central vertical section of the same.

Fig. 3, is a fragmentary vertical section of the upper end of the device, on the line III—III of Fig. 1.

In the said drawing, 1 indicates a slightly tapering tube or shell of sufficiently thin material as to be easily forced through an apple or analogous fruit, and said tube at its lower or smaller end is provided with a series of notches 2 and at its upper or larger end is formed with or secured to a metal collar 3, the internal diameter of which is slightly larger than the diameter of the tube at its point of greatest diameter, and said collar is internally threaded as at 4 and provided with radial kerfs 5 corresponding in number and in radial position with the notches 2 in the lower end of the tube or shell.

The device as thus far described can be used for coring an apple or the like by simply placing it properly on the apple and applying pressure upon its upper end, that is upon the collar.

If the device is to be used for dividing an apple radially into sections a series of blades are adapted to be secured to the collar, each blade comprising an upright stem 6 provided at its lower end with an outwardly projecting foot 7 having a serrated edge 8 to facilitate the cutting operation, the line of serrations being arcual by preference to permit the blade to have a shearing cut and thus be more easily operated.

Each blade is provided at its inner lower corner with an upwardly projecting hook 9 to fit through one of the notches 2 and against the inner side of the shell above such notch, and at its upper end is fitted in the corresponding radial kerf 5 of the collar, and near its upper end with an inwardly projecting lug 10 to overlie and engage the upper edge of the shell. It will thus be seen that the engagement of the hook 9 with the notch in the lower end of the shell prevents upward movement of the blade when in place or lateral movement of the lower end of the blade, and that downward movement of the blade is prevented by the engagement of the lug 10 with the upper end of the shell, lateral movement of the upper end of the blade being prevented by the engagement thereof with one of the kerfs 5.

To secure the blades in place by preventing outward movement of their upper ends, a cap 11 is fitting upon and engages the upper side and outer surface of the collar 3 and by bridging the outer sides of the kerfs 5 prevents outward movement of the blades, the said cap having a central passage or opening 12 of substantially the same diameter as the internal diameter of the upper end of the shell so that the core of an apple or the like may be free to pass through the cap, the latter being provided with a depending externally threaded flange 13 for engagement with the internal thread 4 of collar 3, as shown most clearly in Fig. 3. For convenience of manipulation, the cap is provided with diametrically opposite arms or grips 14, the same serving as handles for the cap in screwing and unscrewing the same into and out of position.

It will be apparent that by the use of these blades an apple can be split into a plurality of sections at the same time that the core is extracted from it, and it is equally obvious that the blades employed may be equal or less in number than the notches in the shell, and that they may be arranged at equal or unequal distances apart and thus permit the apple or the like to be cut into sections of equal or unequal size or in a plurality of sections of equal size and other sections of unequal size.

From the above description it will be apparent that I have produced a device of the character described which embodies the features of advantage enumerated as desirable in the statement of the object of the invention, and it is obviously susceptible of modification in minor particulars without departing from the principle of construction involved or sacrificing any of the advantages of the appended claims.

I claim:

1. In a device of the character described a downwardly tapering shell of circular form in cross-section, an internally threaded collar secured upon the upper end of the shell, a cap fitting upon the collar and provided with a central opening in line with the bore of the shell and with a depending collar marginally surrounding said opening and provided with external threads engaging the internal threads of said collar; said cap being provided with oppositely projecting handles for screwing the same upon or unscrewing it from said collar.

2. A fruit corer and cutter, comprising a downwardly tapering shell, radial blades arranged around and bearing against said shell and provided with hooks and lugs respectively interlocked with the lower end and overlying and engaging the upper end of the shell, a collar provided with radial kerfs receiving the upper ends of the blades and internally threaded, and a cap fitting over the collar and holding the upper ends of the blades against outward radial movement, and provided with a central opening in line with the shell, and with a depending externally threaded circular flange screwed into the collar and terminating above the said lugs of the shell.

In testimony whereof I affix my signature.

HENRY E. MEYERS.